United States Patent
Stusak et al.

(10) Patent No.: US 10,793,392 B2
(45) Date of Patent: Oct. 6, 2020

(54) ELECTROMAGNETIC DEVICE FOR ELIMINATING A YARN LOOP WHEN WINDING YARN ON A CROSS-WOUND BOBBIN ON A SPINNING MACHINE AT A CONSTANT SPEED OF THE YARN PRODUCTION

(71) Applicant: Rieter CZ s.r.o., Usti nad Orlici (CZ)

(72) Inventors: Miroslav Stusak, Chocen (CZ); Milan Moravec, Usti nad Orlici (CZ)

(73) Assignee: Rieter CZ s.r.o., Usti nad Orlici (CZ)

( * ) Notice: Subject to any disclaimer, the term of this patent is extended or adjusted under 35 U.S.C. 154(b) by 120 days.

(21) Appl. No.: 16/079,569

(22) PCT Filed: Feb. 23, 2017

(86) PCT No.: PCT/CZ2017/050007
§ 371 (c)(1),
(2) Date: Aug. 24, 2018

(87) PCT Pub. No.: WO2017/144031
PCT Pub. Date: Aug. 31, 2017

(65) Prior Publication Data
US 2019/0071276 A1    Mar. 7, 2019

(30) Foreign Application Priority Data
Feb. 24, 2016   (CZ) .............................. PV 2016-102

(51) Int. Cl.
*B65H 59/00* (2006.01)
*H01F 7/122* (2006.01)
(Continued)

(52) U.S. Cl.
CPC ........... *B65H 59/005* (2013.01); *H01F 7/122* (2013.01); *H01F 7/14* (2013.01); *H02K 26/00* (2013.01); *B65H 2701/31* (2013.01)

(58) Field of Classification Search
CPC ... B65H 59/005; B65H 2701/31; H01F 7/122; H01F 7/14; H02K 26/00
See application file for complete search history.

(56) References Cited

U.S. PATENT DOCUMENTS

| | | | |
|---|---|---|---|
| 6,375,112 B1 * | 4/2002 | Engelhardt | .......... B65H 59/005 |
| | | | 242/417 |
| 2005/0012580 A1 * | 1/2005 | Kaneshige | ............. H02K 26/00 |
| | | | 335/270 |

FOREIGN PATENT DOCUMENTS

| | | |
|---|---|---|
| CZ | 304874 B6 | 12/2014 |
| DE | 10 2004 029925 A1 | 1/2005 |

(Continued)

OTHER PUBLICATIONS

PCT Search Report, dated Jun. 21, 2017.

*Primary Examiner* — Mohamad A Musleh
(74) *Attorney, Agent, or Firm* — Dority & Manning, P.A.

(57) ABSTRACT

An electromagnetic device for eliminating a yarn loop during winding of a yarn on a cross-wound bobbin on a spinning machine at a constant speed of the yarn production includes a cylindrical two pole magnet rotatably mounted about a longitudinal axis thereof. A compensatory arm is connected to the two pole magnet. A magnetic core includes two poles situated opposite of each other, with the cylindrical two pole magnet rotatable between the poles. A side of the magnetic core opposite from the two poles passes through a cavity of an electrical coil, wherein the magnetic core is interrupted in the cavity. A two pole permanent magnet is located at the point of the interruption of the magnetic core in the cavity of the electrical coil.

2 Claims, 1 Drawing Sheet

(51) Int. Cl.
*H01F 7/14* (2006.01)
*H02K 26/00* (2006.01)

(56) References Cited

FOREIGN PATENT DOCUMENTS

| | | |
|---|---|---|
| EP | 0 854 561 A2 | 7/1998 |
| EP | 2 955 142 A1 | 12/2015 |
| JP | H07 123681 A | 5/1995 |
| JP | H09 100739 A | 4/1997 |
| JP | H11 8963 A | 1/1999 |

* cited by examiner

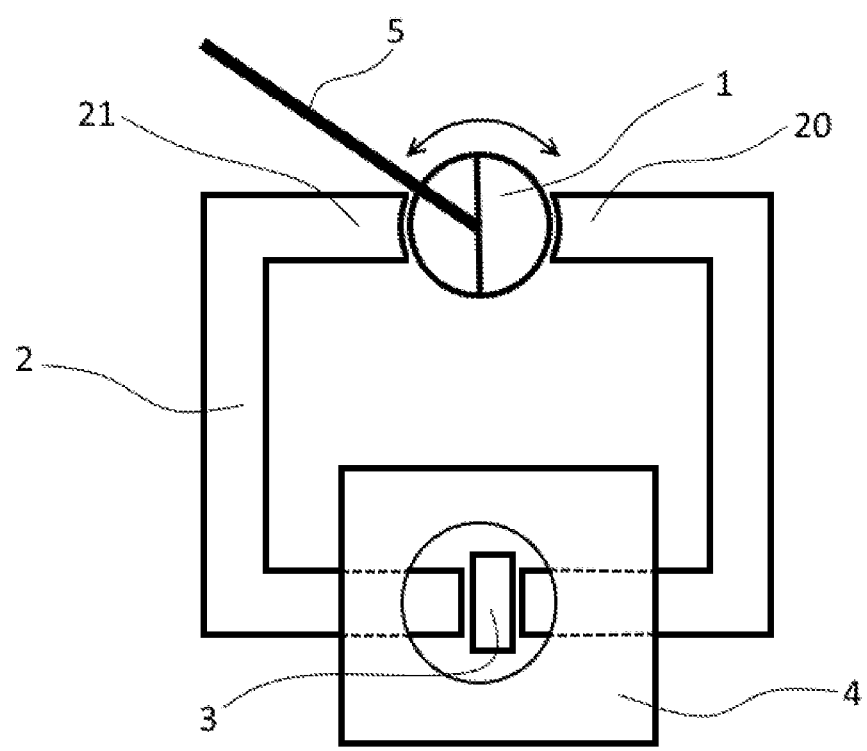

ELECTROMAGNETIC DEVICE FOR ELIMINATING A YARN LOOP WHEN WINDING YARN ON A CROSS-WOUND BOBBIN ON A SPINNING MACHINE AT A CONSTANT SPEED OF THE YARN PRODUCTION

TECHNICAL FIELD OF THE INVENTION

The invention relates to an electromagnetic device for eliminating a yarn loop during the process of winding yarn on a cross-wound bobbin on a spinning machine at a constant speed of the yarn production. The device includes a cylindrical two-pole magnet, which is connected to a compensatory arm of a yarn loop and which is mounted rotatably about its longitudinal axis between two pole pieces of a magnetic core of a coil, which are situated opposite each other. On the side remote from the cylindrical two-pole magnet and the pole pieces, the magnetic core passes through the electrical coil connected to a source of electrical energy and to a control device.

BACKGROUND

During the winding of yarn on a cross-wound bobbin on a spinning machine at a constant speed of the yarn production, for example, on an open-end spinning machine or on a jet-nozzle spinning machine, due to the traversing of the yarn across the width of the bobbin, the yarn is periodically slackened. As a result, it is necessary to compensate for this slackening by lengthening and shortening the length of the yarn travel path between the drawing-off mechanism and the yarn winding device owing to the constant speed of the yarn production and the constant speed of the yarn draw-off process from the spinning unit. For this purpose, various compensators can be used, which include a compensatory arm that, by one of its ends, acts upon the yarn, lengthening or shortening the travel path of the yarn at a workstation in the relevant section between the drawing-off mechanism of yarn and the winding device of yarn as required, while maintaining a constant tension in the yarn, which is a necessary condition for proper winding of yarn on the bobbin.

However, as development has shown especially recently, existing solutions of spring compensators have their limitations, which worsen meeting technological requirements for cross-wound bobbin formation to maintain simplicity of construction, possibility of easy and fast setting of the individual parts of the device and the device itself, also with regard to the needs of the activities and manual handling operations carried out during transient phases at a workstation, such as spinning-in yarn, yarn breakage, replacing a bobbin, etc.

CZ PV 2014 00399 (CZ 305860) discloses a device for eliminating a yarn loop when winding yarn on a cross-wound bobbin on a spinning machine at a constant speed of the yarn production. The device includes a movable compensatory arm with a gripping and guiding means, whose path intersects the path of the yarn between a drawing-off mechanism of the yarn and a winding device of the yarn. The compensatory arm is fixedly mounted on an output element of a reversible two-way controlled means, which is connected to a control device for controlling the position and/or direction and/or speed and/or force application of the output element of the reversible two-way controlled means. In one embodiment, the reversible two-way controlled means includes a cylindrical two pole magnet on which a compensatory arm is mounted and which is mounted rotatably about its longitudinal axis in a magnetic circuit with a coil, which is connected to a source of electrical energy for the excitation of the coil according to the instructions received from the control device. The magnetic circuit with the coil comprises a stirrup, whereby at standstill the position of the cylindrical two pole magnet is such that the north pole of the magnet is situated opposite one pole extension of the stirrup, whereas the south pole of the magnet is positioned opposite the other pole extension of the stirrup.

Although this solution of an electromagnetic device for eliminating a yarn loop, i.e. a magnetic compensator, does have numerous advantages, particularly in terms of speed of reaction and a relatively large oscillation, it has a shortcoming from the point of view of limited controllability, which manifests itself in certain situations.

The aim of the invention is to achieve further improvement in the functional properties of the electromagnetic device for eliminating a yarn loop when winding yarn on a cross-wound bobbin on a spinning machine at a constant speed of the yarn production.

SUMMARY OF THE INVENTION

Objects and advantages of the invention will be set forth in part in the following description, or may be obvious from the description, or may be learned through practice of the invention.

The goals of the invention are achieved by an electromagnetic device for eliminating a yarn loop during the process of winding yarn on a cross-wound bobbin on a spinning machine at a constant speed of the yarn production, the principle of the device consists in that the magnetic core in the cavity of the coil is interrupted and a two pole permanent magnet is located at the point of interruption.

The advantage of this solution is the fact that the working range of the compensatory arm extends to an angle greater than 90° without a danger of twisting the cylindrical two pole magnet with the compensatory arm due to the influence of the magnetic poles of the cylindrical two pole magnet and the pole pieces of the magnetic core, which are attracted to each other.

BRIEF DESCRIPTION OF DRAWING

The invention is schematically represented in the enclosed drawing, where FIG. 1 shows a functional diagram of the arrangement of the device according to the invention.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The invention will be described using exemplary embodiments of arrangement and functioning of an electromagnetic device for eliminating a yarn loop at a workstation of a spinning machine between a drawing-off mechanism of the yarn from a spinning unit and a winding device of the yarn onto a cross-wound bobbin. The workstation as such is well-known in the art and therefore here it will be described only symbolically without a drawing. The spinning machine comprises at least one row of identical workstations arranged next to each other, each of which comprises a spinning unit in which yarn is formed. Above the spinning unit is located a yarn drawing-off mechanism. The yarn drawing-off mechanism includes a well-known pair of rollers, between which the yarn passes and which are mounted in the machine frame. One of the drawing-off rollers is coupled to a drive and constitutes a driven drawing-off roller, whereas the other roller is a pressure drawing-off roller, which is rotatably mounted on a spring-loaded arm that pushes it onto the driven drawing-off roller. In the yarn path behind the drawing-off mechanism is disposed a yarn winding device, which includes a yarn traversing device, by which the yarn being wound is traversed across the width of the bobbin. The device for eliminating a yarn loop is arranged at the workstation in the yarn path between the drawing-off mechanism and the winding device and, is an electromagnetic device for eliminating a yarn loop.

The electromagnetic device for eliminating a yarn loop comprises a cylindrical two pole magnet 1, on which is mounted a compensatory arm 5 of a yarn loop, whereby the cylindrical two pole magnet 1 is mounted rotatably about its longitudinal axis between two pole pieces 20, 21 of the magnetic core 2 situated opposite each other. The pole pieces 20, 21 of the magnetic core 2 have a profile (shape) of their heel portion, which is preferably in the form of a radius, that affects the range of oscillation or the working range of the compensatory arm 5. The profile (shape) of the heel portion of the pole pieces 20, 21 is optimized in relation to the profile (shape) of the cylindrical two pole magnet 1, as well as in relation to an air gap between the heel portion of the pole pieces 20, 21 and the cylindrical two pole magnet 1, taking into account the magnetic flux from the cylindrical two-pole magnet 1. Preferably, the magnetic core 2 is made of magnetically-soft steel.

At its other end, i.e. on the side remote from the cylindrical two-pole magnet and from the pole pieces 20, 21 of the magnetic core 2, the magnetic core 2 is interrupted and a permanent magnet 3 is situated in the formed gap. In principle, the magnetic core 2 consists of a pair of identical C-shaped bodies oriented opposite each other, whose ends on one side constitute pole pieces 20, 21 of one end of the magnetic core 2 and whose other ends are arranged in the vicinity of the permanent magnet 3 or they abut against it. The magnetic flux caused by the permanent magnet 3 is in comparison with the magnetic flux of the cylindrical two pole magnet 1 comparable. The permanent magnet 3 by its magnetic flux affects the characteristics of the magnetic field in the area around the pole pieces 21, 20 so that it extends the possible working angle of turning of the cylindrical two-pole magnet 1 and thus the amplitude of the extreme positions of the compensatory arm 5 to a range (greater than 90°) without twisting the cylindrical two-pole magnet 1 due to the influence the magnetic poles of the cylindrical two pole magnet 1 and the pole pieces 20, 21 of the magnetic core 2, which are attracted to each other.

Around the permanent magnet 3 and the abutting ends of the magnetic core 2 is situated an electrical coil 4, which is connected to a source of electrical energy for its excitation according to the instructions of the control device. Thus, the magnetic core 2 is substantially the core of the electrical coil 4.

The cylindrical two pole magnet 1, the electrical coil 4 and the permanent magnet 3 generate a common magnetic flux. To improve control, the compensatory arm 5 and/or the cylindrical two pole magnet 1 is aligned with at least one sensor 8 of the position of the compensatory arm 5, which is connected to the control device.

Modifications and variations can be made to the embodiments illustrated or described herein without departing from the scope and spirit of the invention as set forth in the appended claims.

The invention claimed is:

1. An electromagnetic device for eliminating a yarn loop during winding of a yarn on a cross-wound bobbin on a spinning machine at a constant speed of the yarn production, comprising:
   a cylindrical two pole magnet rotatably mounted about a longitudinal axis thereof;
   a compensatory arm connected to the cylindrical two pole magnet;
   a magnetic core, the magnetic core comprising two poles situated opposite of each other, the cylindrical two pole magnet rotatable between the poles;
   an electrical coil, a side of the magnetic core opposite from the two poles passing through a cavity of the electrical coil, wherein the magnetic core is interrupted with a gap in the cavity of the electrical coil; and
   a two pole permanent magnet located at the gap of the interruption of the magnetic core in the cavity of the electrical coil.

2. The electromagnetic device according to claim 1, wherein the magnetic core comprises a pair of C-shaped elements oriented opposite each other, one end of the C-shaped elements forming the poles and an opposite end of the C-shaped elements arranged in the gap of the magnetic core adjacent to or abutting against the two pole magnet.

* * * * *